United States Patent [19]

Butler et al.

[11] 4,121,461

[45] Oct. 24, 1978

[54] ELECTRONIC TEMPERATURE SENSOR

[75] Inventors: Walter J. Butler, Scotia; Charles W. Eichelberger, Schenectady, both of N.Y.

[73] Assignee: General Electric Company, Schenectady, N.Y.

[21] Appl. No.: 852,241

[22] Filed: Nov. 17, 1977

[51] Int. Cl.² ............................................. G01K 7/16
[52] U.S. Cl. ................................. 73/362 SC; 307/310
[58] Field of Search ................... 73/362 SC; 307/310; 463/557

[56] References Cited

U.S. PATENT DOCUMENTS

| 3,809,929 | 5/1974 | Vittoz | 73/362 SC |
|---|---|---|---|
| 3,826,983 | 7/1974 | Garratt | 324/99 D |
| 3,882,384 | 5/1975 | List | 73/362 SC |
| 3,950,991 | 4/1976 | Grass | 73/362 SC |

*Primary Examiner*—S. Clement Swisher

*Attorney, Agent, or Firm*—Geoffrey H. Krauss; Joseph T. Cohen; Marvin Snyder

[57] ABSTRACT

An electronic temperature sensor utilizing monolithic charge transfer circuitry is disclosed. A first charge transfer circuit supplies a charge storage element with $N_1$ first charge packets, $N_1$ being the number of charge packets required to change the charge stored by the charge storage element from a first to a second value. A second charge transfer circuit supplies the charge storage element with $N_2$ second charge packets, $N_2$ being the number of charge packets required to change the charge stored by the charge storage element from the first to the second value. The magnitude of the second charge packet varies from the magnitude of first packet as the linear function of the temperature to the sensor. A counter generates an output signal which is a function of the difference between $N_1$ and $N_2$ and which is indicative of the magnitude of the temperature to be sensed.

4 Claims, 5 Drawing Figures

ELECTRONIC TEMPERATURE SENSOR

BACKGROUND OF THE INVENTION

When using a thermocouple as a temperature sensor, the output voltage of the thermocouple provides an indication of the difference in temperature between the hot and cold junctions of the thermocouple. Accordingly, in order to accurately determine the absolute temperature of the hot junction, it is necessary to know the temperature of the cold junction. In many applications, the cold junction is at room or ambient temperature and therefore varies considerably. As a result of such variation, it becomes highly desirable to provide a means for measuring the instantaneous ambient or room temperature.

As a result of recent advances in micro-computer technology, it has become feasible to utilize micro-computers as control systems for household and other appliances. When utilizing such systems, it is necessary to interface analog temperature sensors (such as thermocouple) to the digital inputs of the micro-computer. To this end, the art has developed several analog to digital converter circuits for such interfacing. One example of such circuitry is U.S. Pat. No. 3,826,983.

BRIEF DESCRIPTION OF THE INVENTION

In view of the foregoing developments in both the micro-processor and charge transfer art, it becomes highly desirable to design an ambient temperature sensor utilizing the charge transfer technology of the charge transfer analog to digital converters. Preferably, the same charge transfer circuitry can be used both in the analog to digital circuit and in the ambient temperature sensor in order to reduce duplication of circuitry. The foregoing result may be attained by utilizing the charge transfer circuitry as an integral portion of the temperature sensor during a first portion of the conversion operation and then using the same charge transfer circuitry as part of the analog to digital converter during a second portion of the conversion cycle.

The foregoing desirable results are obtained by designing an electronic temperature sensor utilizing first and second charge supply circuits for generating a plurality of first and a plurality of second charge packets, respectively. By properly operating the first and second charge transfer circuits, it is possible to control the magnitude of the first and second charge packets such that the difference in the magnitudes thereof varies as a linear function of the ambient temperature being sensed. During a first portion of the temperature sensing cycle, a control means causes the first charge transfer circuit to supply the charge storage means with $N_1$ first charge packets, $N_1$ being the number of first charge packets required to change the charge stored by the charge storage means from a first to a second value. During a second portion of the temperature sensing cycle, the control means causes the second charge transfer circuit to supply the charge storage means with $N_2$ second charge packets, $N_2$ being the number of charge packets required to change the charge stored by the charge storage means from the first to the second value. A counter generates an output signal which is a function of the difference between $N_1$ and $N_2$ which is indicative of the difference in the magnitude of the first and second charge packets. Since this difference is a linear function of the temperature being sensed, the output signal generated by the counter provides a digital indication of the ambient temperature being sensed.

BRIEF DESCRIPTION OF THE DRAWINGS

For the purpose of illustrating the invention, there is shown in the drawings several embodiments which are presently preferred; it being understood, however, that this invention is not limited to the precise arrangements and instrumentalities shown.

DETAILED DESCRIPTION OF THE INVENTION

Figure 1:
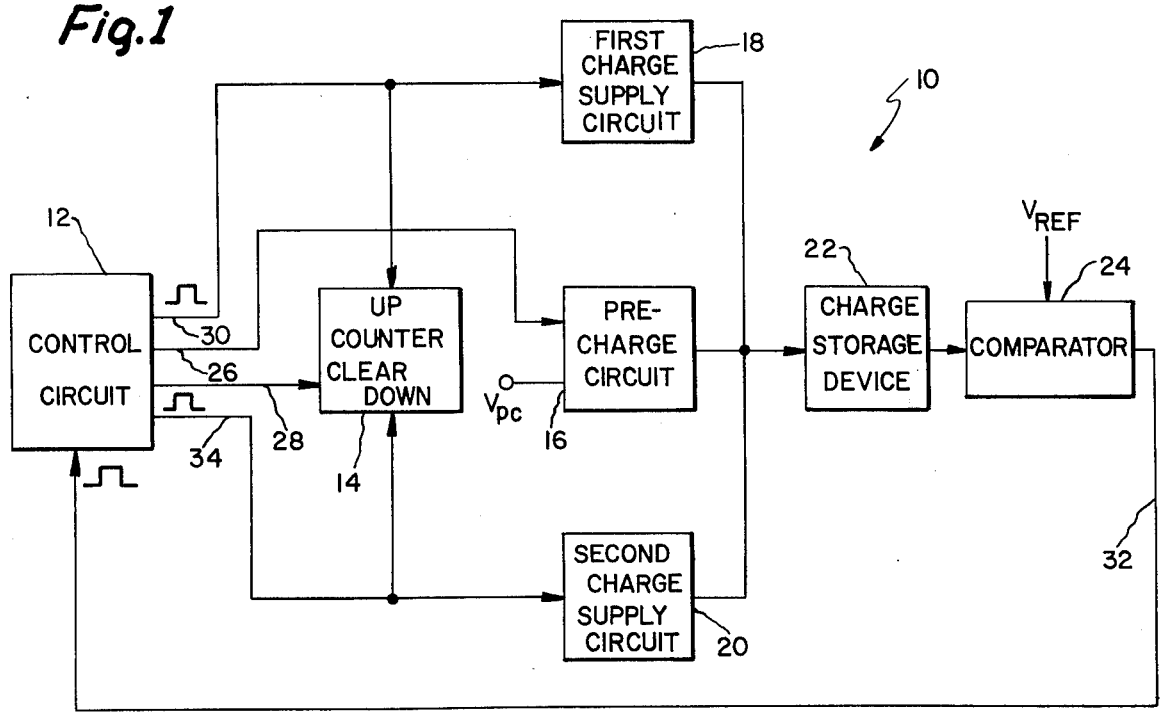
FIG. 1 is a block diagram of a temperature sensor constructed in accordance with the principles of the present invention.

Referring now to the drawings, wherein like numerals indicate like elements, there is shown in FIG. 1 an electronic temperature sensor constructed in accordance with the principles of the present invention and designated generally 10. Electronic temperature sensor 10 comprises a control circuit 12, a counter 14, a precharge circuit 16, first and second charge supply circuits 18 and 20, a charge storage device 22 and a comparator 24.

Control circuit 12 generates a plurality of gating pulses on selected ones of lines 26, 28, 30 and 34 at various times throughout the operation of temperature sensing circuit 30. The timing of these gating signals is illustrated by waveforms (a), (b), (c) and (e), respectively, in FIG. 2 and will be described in greater detail below. Control circuit 12 may be formed by any hardwired or computer circuitry and is well within the skill of the art. Accordingly, the particular structure of control circuit 12 will not be described herein.

Counter 14 is a standard up/down digital counter having up, down and clear inputs. The count in counter 14 is increased by one count each time a gating pulse is generated on line 30 and is decreased by one count each time a gating pulse is generated on line 34. The count in counter 14 is cleared whenever a gating pulse is generated on line 28. Precharge circuit 16 may be a simple electronic switch which applies a predetermined voltage $V_{pc}$ to charge storage device 22 whenever control circuit 12 generates a gating pulse on line 26.

First and second charge supply circuits 16 and 18 are preferably, but not necessarily, charge transfer circuits which deliver a discrete packet of charge to charge storage device 22 whenever a gating pulse is generated on lines 30 and 34, respectively. While the exact magnitude of the output pulses generated by charge supply circuits 18 and 20 is not critical, it is necessary that their relative magnitudes vary by an amount which is linearly proportional to the ambient temperature being sensed. Charge storage device 22 may be any known charge storage element but is preferably a capacitor. Comparator 24 is a standard analog comparator which generates an output signal on line 32 whenever the voltage determined by the charge stored on the charge storage device 22 becomes greater than the reference voltage $V_{ref}$.

Figure 2:
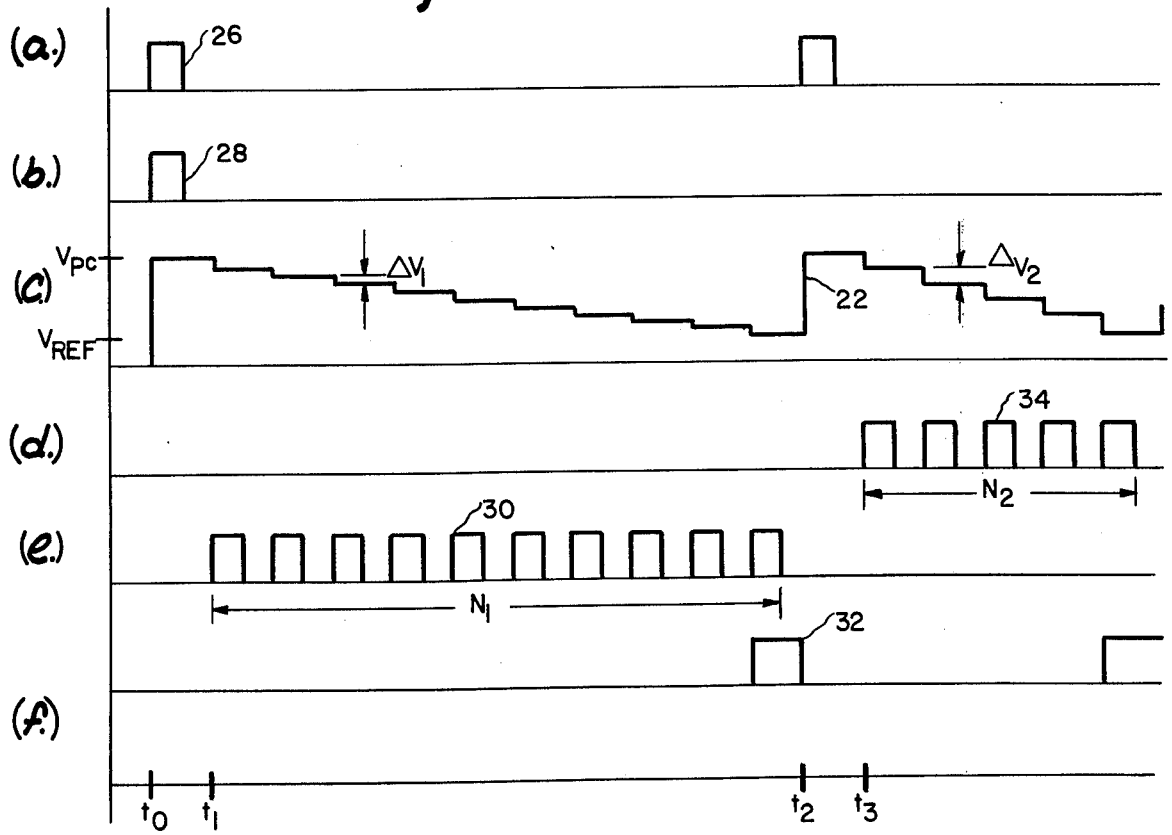
FIG. 2 is a set of coordinated graphs illustrating voltages appearing at various points in the block diagram of FIG. 1.

The operation of the electronic temperature sensor of FIG. 1 will now be described with reference to FIG. 2. At the initiation of a temperature sensing operation (at time $t_o$) control circuit 12 generates a single gating pulse on both lines 26 and 28. See waveforms (a) and (b) of FIG. 2. The gating pulse generated on line 28 clears the count in counter 14 and the gating pulse generated on line 26 causes precharge circuit 16 to charge the charge storage device 22 to a preset voltage $V_{pc}$. At time $t_1$, control circuit 12 begins generating a plurality of gating pulses on line 30 causing first charge supply circuit 18 to apply a plurality of discrete charge packets to charge storage device 22. See waveform (e) of FIG. 2. Each time charge supply circuit 18 is gated by another gating pulse 30, it causes the voltage stored by charge storage device 22 to decrease by an amount $\Delta V_1$. See waveform (c) of FIG. 2. After $N_1$ pulses have been generated by control circuit 12, the charge across charge storage device 22 will have decreased to the value $V_{ref}$ and comparator 24 will generate an output pulse on line 32. See waveform (f) of FIG. 2. The output pulse generated by comparator 24 signifies the end of the first portion of the temperature sensing operation and the count in counter 14 is $N_1$.

At time $t_2$, control circuit 12 generates an output pulse on line 26 causing precharge circuit 16 to recharge charge storage device 22 to $V_{pc}$ volts. At time $t_3$, control circuit 12 begins generating a succession of gating pulses on line 34. Each time second charge supply circuit 20 is gated by another gating pulse 34, it causes the voltage stored by charge storage device 22 to decrease by an amount $\Delta V_2$. After $N_2$ gating pulses have been generated on line 34, the voltage across charge storage device 22 is reduced to $V_{ref}$ volts and comparator 24 again generates an output signal on line 32. See waveforms (c) and (f) of FIG. 2. This output signal indicates the termination of the second portion of the temperature sensing operation and causes control circuit 12 to cease generating output pulses on line 34. The count in counter 14 now represents the value $N_1 - N_2$.

As noted above, magnitude of each charge packet supplied by first charge supply circuit 18 differs from the magnitude of those charge packets supplied by second charge supply circuit 20 by an amount which is a linear function of temperature. Accordingly, the magnitudes of $\Delta V_1$ and $\Delta V_2$ also differ as a function of temperature. Since the total amount of charge supplied to charge storage device 22 by first charge supply circuit 18 is equal to the total amount of charge supplied by second charge supply circuit 20, (i.e. an amount equivalent to $V_{pc} - V_{ref}$ in both cases) the difference between the number of charge packets supplied to charge storage device 22 by first charge supply circuit 18 and the number of charge packets supplied to charge storage device 22 by second charge supply circuit 20 is directly related to the ambient temperature being sensed. The count in counter 14 is therefore a function of the temperature being sensed.

Figure 3:
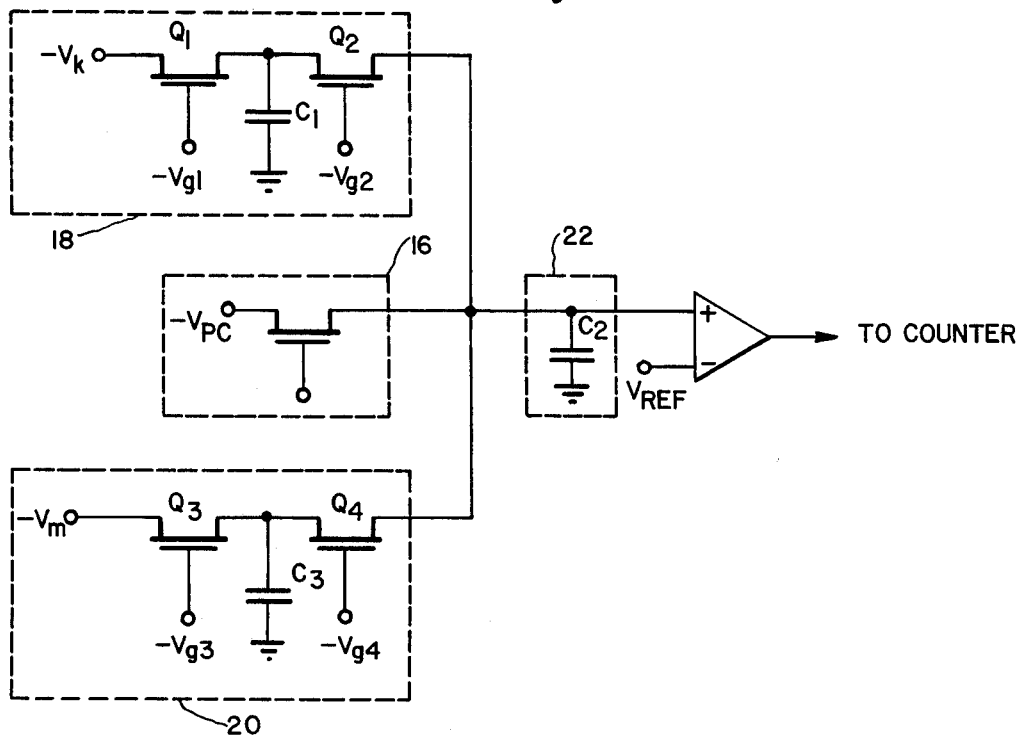
FIG. 3 is a circuit diagram of a portion of the temperature sensor of FIG. 1.

A circuit diagram of a portion of the temperature sensor shown in block diagram form in FIG. 1 is illustrated in FIG. 3. In this Figure, the counter and control circuit have been omitted. Their cooperation with the elements of FIG. 3 will, however, be described.

In the embodiment illustrated in FIG. 3, the first charge supply circuit 18 comprises a bucket brigade circuit of the type well known in the art. Circuits of this type are described in some detail in U.S. application Ser. No. 628,542, filed Nov. 26, 1974 in the names of Walter J. Butler and Charles M. Puckette and assigned to the assignee of the present invention and incorporated herein by reference. Briefly, circuits of this type include a first MOSFET transistor $Q_1$ biased to operate as a switch and a second MOSFET transistor $Q_2$ biased to operate as a "shelf" transistor. During a first clock period, a gating pulse $-V_{g1}$ is applied to the gate of transistor $Q_1$ applying the analog voltage $-V_k$ across capacitor $C_1$. During the next clock period, a gating pulse $-V_{g2}$ is applied to the gate of transistor $Q_2$ causing charge to transfer from capacitor $C_1$ to capacitor $C_2$ (comprising charge storage device 22) until the voltage across capacitor $C_1$ decreases to a value equal to the gate voltage applied to transistor $Q_2$ less the threshold voltage of that transistor. The net effect of this operation is to increase the voltage across capacitor $C_2$ by an amount:

$$\Delta V_1' = (V_{g2} - V_{t2} - V_k)/K + q_L C_2 \qquad (1)$$

wherein $V_{t2}$ is the threshold voltage of the transistor $Q_2$, K is the ratio of the capacitance of capacitors $C_2$ and $C_1$, respectively, and $q_L$ is a thermally induced leakage charge occurring in the substrate, in which the elements of FIG. 3 are all preferably formed, which leakage charge is collected by capacitor $C_2$. It should be noted at this point that the charge transferred from capacitor $C_1$ to capacitor $C_2$ will be either positive or negative depending upon the type of MOSFET transistor utilized. If a n-channel MOSFET is used, negative charge will be transferred from capacitor $C_1$ to capacitor $C_2$. If an p-channel MOSFET is used, positive charge will be transferred from capacitor $C_1$ to capacitor $C_2$. In the embodiment illustrated in FIG. 1 it was assumed that positive charge was transferred to charge storage device 22. In the embodiment illustrated in FIG. 3, it is assumed that p-channel MOSFETS are used and that positive charge is transferred from capacitor $C_1$ to capacitor $C_2$. The same assumption will be made with respect to second charge supply circuit 20. It should be understood, however, that the term "charge" as used herein refers to either positive or negative charge depending upon the particular type of device used.

Second charge supply circuit 20 is also a charge transfer circuit comprising first and second MOSFET transistors $Q_3$ and $Q_4$ and a capacitor $C_3$. The primary difference between second charge supply circuit 20 and first charge supply circuit 18 is that transistor $Q_3$ (like transistors $Q_2$ and $Q_4$) is biased to operate in a "shelf" transistor mode. During a first clock period, a gating pulse $-V_{g3}$ is applied to the gate of transistor $Q_3$ causing charge to flow from capacitor $C_3$ to the negative voltage $-V_m$ until the voltage across capacitor $C_3$ decreases to a value equal to the gate voltage $-V_{g3}$ of transistor $Q_3$ less its threshold voltage. During the next clock period, a gating pulse $-V_{g4}$ is applied to the gate of transistor $Q_4$ causing charge to transfer from capacitor $C_3$ to capacitor $C_2$ until the voltage across capacitor $C_3$ decreases to a value equal to its gate voltage $-V_{g4}$ less its threshold voltage. The net effect of this operation is to increase the voltage across capacitor $C_2$ by an amount:

$$\Delta V_2' = (V_{g4} - V_{t4} - V_{g3} + V_{t3})/K + q_L C_2 \qquad (2)$$

wherein $V_{t3}$ is the threshold voltage of transistor $Q_3$, $V_{t4}$ is the threshold voltage of capacitor $Q_4$, K is the ratio of the capacitance of capacitors $C_3$ and $C_2$, respectively, and $q_L$ is the thermally induced leakage charge.

If the electrical characteristics of transistors $Q_3$ and $Q_4$ are closely matched, their threshold voltages will also be closely matched. Under such conditions, equation (2) may, to a first approximation, be reduced to:

$$\Delta V_2' = (V_{g4} - V_{g3})/K + q_L C_2 \quad (3)$$

Examining equation 1, it can be seen that the increase in voltage $\Delta V_1'$ across capacitor $C_2$ during each charge transfer operation of first charge supply circuit 18 varies from a constant value as a two-fold function of temperature. Particularly, the magnitude of the charge packet transferred by circuit 18, and therefore the magnitude of the voltage change across capacitor $C_2$, varies both as a result of the thermally induced leakage charge $q_L$ and the threshold voltage $V_{t2}$, which voltage is known to vary as a linear function of temperature. See Cobbold, *Theory and Applications of FETs* (Wiley, 1970), p. 261; and Wallmark and Johnson, *Field Effect Transistors*, (Prentice-Hall, 1966), p. 154. Examining equation 3, it can be seen that the increase in voltage $\Delta V_2'$ across capacitor $C_2$, each time a charge transfer operation is performed by circuit 20, varies from a predetermined value primarily as a function of the leakage charge $q_L$. Accordingly, the difference between the magnitude of the charge packets generated by circuits 18 and 20 (and therefore the difference in the magnitude of the voltage changes $\Delta V_1'$ and $\Delta V_2'$) is a function of the threshold voltage $V_{t2}$ [see equation (1)] of transistor $Q_2$. To the extent that a MOSFET threshold voltage varies linearly with temperature, the magnitude of the charge packets generated by circuits 18 and 20, and therefore the difference in the number of charge packets $N_1$ and $N_2$ required to change the voltage across capacitor $C_2$ from the first to the second value in the manner noted above, is a function of the temperature of transistor $Q_2$. Accordingly, by computing the difference $N_2-N_1$, it is possible to generate an output signal indicative of the ambient temperature to be sensed. The particular constant of proportionality required for such a computation may be determined by a single calibration of the circuit at a known temperature.

Figure 4:
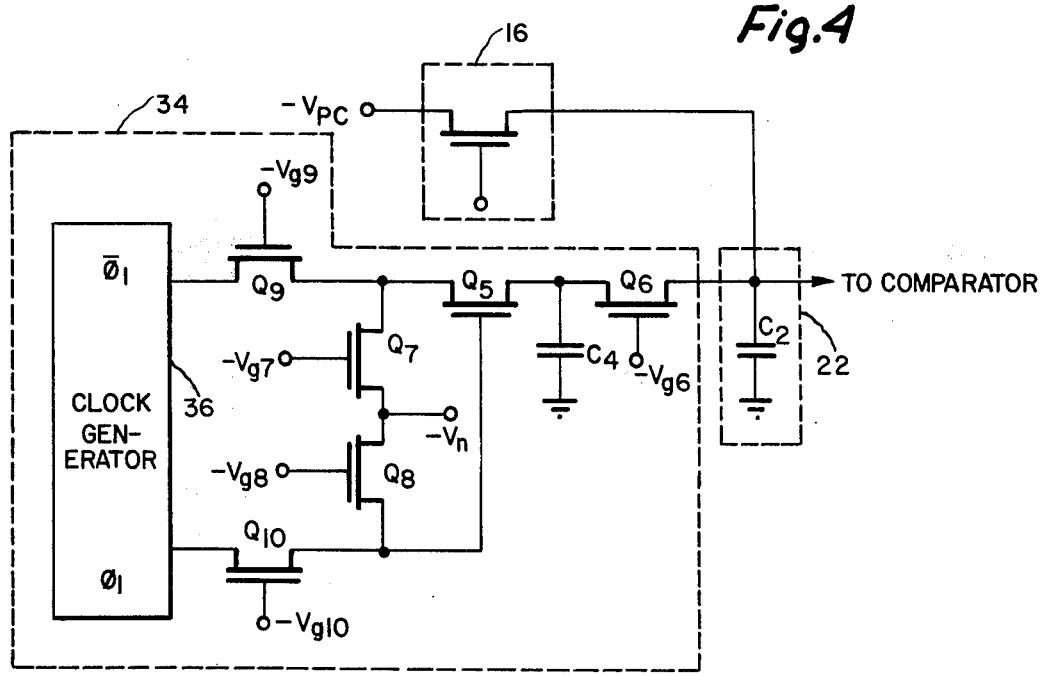
FIG. 4 is a circuit diagram of a modification of the circuit diagram of FIG. 3.

FIG. 4 discloses a preferred embodiment of the circuit of FIG. 3 wherein a single charge transfer circuit 34 is utilized to generate both the first and second sets of charge packets. As with circuits 18 and 20, charge transfer circuit 34 includes a pair of MOSFET transistors $Q_5$ and $Q_6$ and a capacitor $C_4$. Transistor $Q_6$ is biased to operate in the "shelf" transistor mode whenever a negative gating pulse $-V_{g6}$ is applied to its gate terminal. Transistor $Q_5$ is biased to operate either as a "switch" or as "shelf" transistor by a control circuit including transistors $Q_7$ through $Q_{10}$ and clock generator 36. During a first portion of the temperature sensing operation, during which charge transfer circuit 34 is to operate in a similar mode to charge supply circuit 18, transistors $Q_7$ and $Q_{10}$ are gated on and transistors $Q_8$ and $Q_9$ are gated off. In this condition the constant voltage $-V_n$ is applied to the drain of transistor $Q_5$ and the clock voltage $\phi_1$ is applied to the gate thereof. The relative magnitude of voltages $-V_n$ and $\phi_1$ are chosen to bias transistor $Q_5$ into a "switching" mode of operation whereby the constant voltage $-V_n$ is applied across capacitor $C_4$.

When charge transfer circuit 34 is to deliver the second set of charge packets to capacitor $C_2$, and therefore operate in the same manner as circuit 20, transistors $Q_7$ and $Q_{10}$ are gated off and transistors $Q_8$ and $Q_9$ are gated on. In this condition the voltage $-V_n$ is applied to the gate of transistor $Q_5$ and the clock voltage $\phi_1$ is applied to the drain of transistor $Q_5$. These voltages are chosen such that transistor $Q_5$ is biased into a "shelf" mode of operation wherein charge flows from capacitor $C_4$ through the gate of transistor $Q_5$ until the voltage of capacitor $C_4$ is reduced to a value equal to the gate voltage of transistor $Q_5$ less its threshold voltage. Control circuit 12 then applies a gating pulse 34 to transistor $Q_6$ each time another charge packet is to be delivered to capacitor $C_2$.

Figure 5:
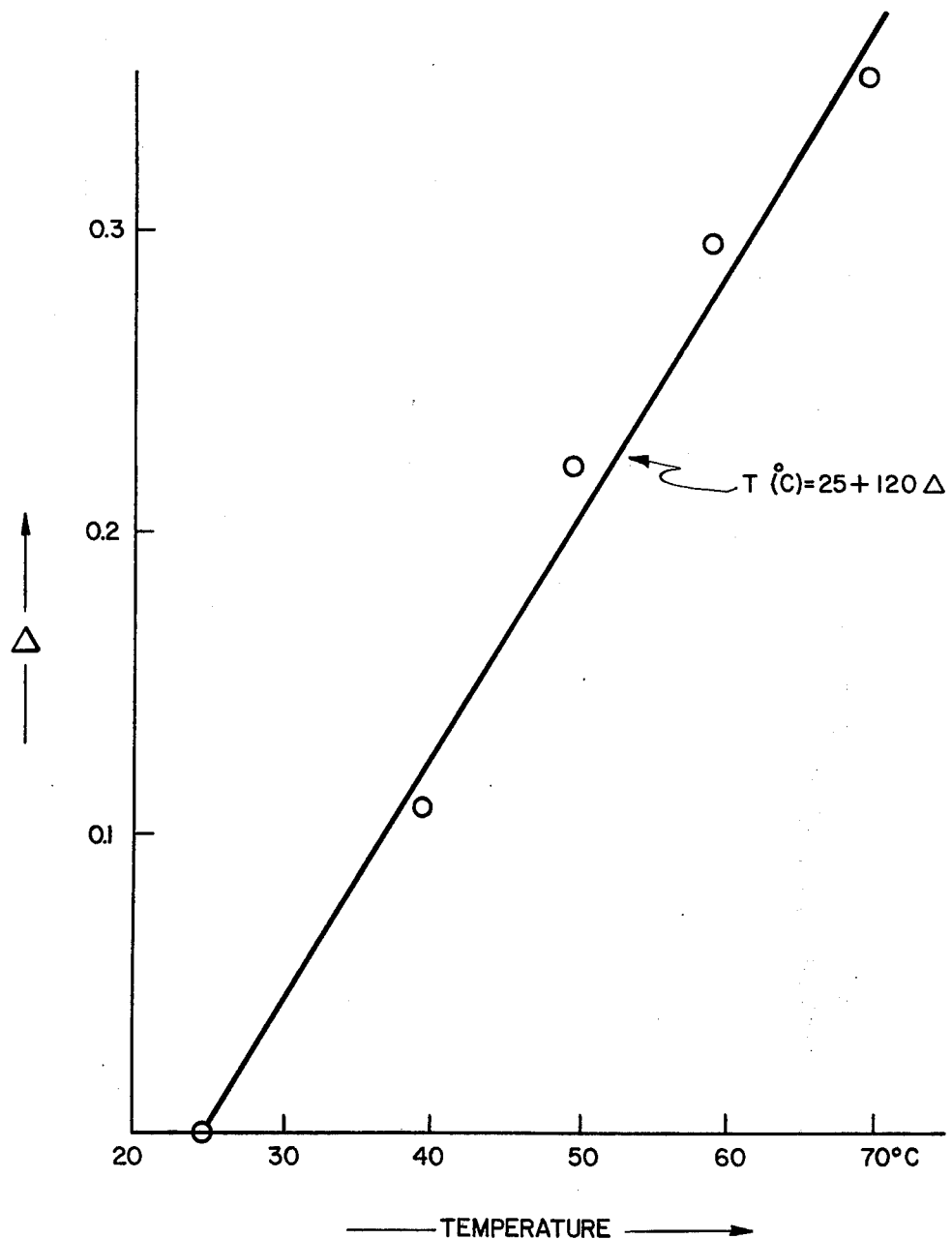
FIG. 5 is a graph illustrating the experimental results of one application of the circuit of FIG. 4.

FIG. 5 is a graph of the experimental results of a temperature sensor constructed in accordance with FIG. 4. In FIG. 5, $\Delta$ is defined as:

$$\Delta = N_1/N_1' - N_2/N_2' \quad (4)$$

wherein $N_1$ and $N_1'$ is the number of charge packets supplied when charge transfer circuit 34 was operating in the first mode at temperatures $T_1$ and $T_2$, respectively, and $N_2$ and $N_2'$ is the number of charge packets supplied by charge transfer circuit 34 during the second mode of operation at temperatures $T_1$ and $T_2$, respectively. The relationship is approximately linear according to:

$$T(° C) = 25 + 120\Delta \quad (5)$$

with an error of less than $\pm 2°$ C over the range 25° C to 70° C.

The present invention may be embodied in other specific forms without departing from the spirit or essential attributes thereof and, accordingly, reference should be made to the appended claims, rather than to the foregoing specification as indicating the scope of the invention.

What is claimed is:

1. An electronic temperature sensor, comprising:
   means for storing charge;
   charge supply means for selectively supplying said charge storage means with a plurality of first or a plurality of second charge packets, the magnitude of said second charge packets varying from the magnitude of said first charge packets as a linear function of the temperature to be sensed;
   control means for causing said charge supply means to supply said charge storage means with $N_1$ first charge packets, wherein $N_1$ is the number of first charge packets required to change the charge stored by said charge storage means from a first to a second value; said control means also for causing said charge supply means to supply said charge storage means with $N_2$ second charge packets, wherein $N_2$ is the number of second charge packets required to change the charge stored by said charge storage means from said first to said second value; and
   means for generating an output signal which is a function of the difference between $N_1$ and $N_2$ and is therefore indicative of the magnitude of said temperature to be sensed.

2. The temperature sensor of claim 1, wherein said charge supply means comprises:
   (A) a charge transfer circuit comprising:
      (1) a capacitor;

(2) a first MOSFET formed in a semiconductor substrate and coupled between said capacitor and said charge storage means;

(3) a second MOSFET having substantially the same electrical characteristics as said first MOSFET and formed in the same said substrate, one terminal of said second MOSFET being coupled to said capacitor; and (B) means for operating said charge transfer circuit:

(1) in a first mode wherein said charge transfer circuit supplies said charge storage means with a charge packet whose magnitude varies from a constant value as a function of both a thermally induced leakage current in said substrate and the threshold voltage of said first MOSFET, and (2) in a second mode wherein said charge transfer circuit supplies said charge storage means with a charge packet whose magnitude varies from a constant value as a function of both said thermally induced leakage current and the difference between the threshold voltages of said first and second MOSFETS, whereby the difference between the magnitude of the charge packet supplied by said charge supply circuit when operated in said first mode and the magnitude of the charge packet supplied by said charge supply circuit when operated in said second mode is a linear function of the temperature of said first and second MOSFETS.

3. The temperature sensor of claim 2 wherein said means for operating said charge transfer circuit in said first and second modes comprises:

(A) means for operating said second MOSFET in a "switch" mode wherein said second MOSFET charges said first capacitor to a predetermined constant value;

(B) means for operating said second MOSFET in a "shelf" mode wherein said second MOSFET charges said first capacitor to a value which varies from a constant value as a function of the threshold voltage of said second MOSFET; and (C) means for:

(1) sequentially biasing said second MOSFET into said "switch" mode and said first MOSFET into said "shelf" mode when said charge transfer circuit is operated in said first mode; and (2) sequentially biasing both said first and second MOSFETs into said "shelf" mode when said charge transfer circuit is operated in said second mode.

4. The temperature sensor of claim 2 wherein said control means sequentially applies a gating pulse to the gates of said first and second MOSFETs whenever said charge supply means is to supply said charge storage means with one of said first or second charge packets and wherein said means for operating said charge transfer circuit in said first or second mode comprises:

means for biasing said first MOSFET into a "shelf" mode whenever a gating pulse is applied thereto;

means for biasing said second MOSFET into a "switching" mode whenever a gating pulse is applied thereto and said charge transfer circuit is to operate in said first mode; and means for biasing said second MOSFET into a "shelf" mode whenever a gating pulse is applied thereto and said charge transfer circuit is to operate in said second mode.

* * * * *